United States Patent
Stewart et al.

(10) Patent No.: US 9,405,001 B2
(45) Date of Patent: Aug. 2, 2016

(54) OPEN LOOP POWER OSCILLATOR DOPPLER RADAR

(71) Applicant: Laufer Wind Group LLC, New York, NY (US)

(72) Inventors: Hamilton Morris Stewart, Hollis, NH (US); Eric David Laufer, New York, NY (US)

(73) Assignee: Laufer Wind Group LLC, New York, NY (US)

( * ) Notice: Subject to any disclaimer, the term of this patent is extended or adjusted under 35 U.S.C. 154(b) by 0 days.

(21) Appl. No.: 14/874,007

(22) Filed: Oct. 2, 2015

(65) Prior Publication Data

US 2016/0025840 A1 Jan. 28, 2016

Related U.S. Application Data

(63) Continuation of application No. 13/832,423, filed on Mar. 15, 2013, now Pat. No. 9,194,945.

(60) Provisional application No. 61/675,120, filed on Jul. 24, 2012.

(51) Int. Cl.
   *G01S 7/28* (2006.01)
   *G01S 7/285* (2006.01)
   *G01S 13/10* (2006.01)
   *G01S 7/288* (2006.01)

(52) U.S. Cl.
   CPC .................. *G01S 7/285* (2013.01); *G01S 7/288* (2013.01); *G01S 13/10* (2013.01)

(58) Field of Classification Search
   CPC ......... G01S 7/285; G01S 13/10; G01S 7/288; G01S 13/449; G01S 2007/2886; G01S 7/032
   USPC .......... 342/93, 82, 84, 98–100, 160–162, 194
   See application file for complete search history.

(56) References Cited

U.S. PATENT DOCUMENTS

| | | | | |
|---|---|---|---|---|
| 4,682,174 A * | 7/1987 | Richmond | ............ | G01S 13/534 342/160 |
| 9,182,485 B1 * | 11/2015 | Andrews | ................ | G01S 13/953 |
| 9,194,945 B2 * | 11/2015 | Stewart | .................... | G01S 13/10 |
| 2014/0028488 A1 * | 1/2014 | Stewart | .................... | G01S 13/10 342/93 |
| 2015/0061918 A1 * | 3/2015 | Chang | .................... | G01S 13/584 342/110 |
| 2015/0070207 A1 * | 3/2015 | Millar | .................... | G01S 13/006 342/174 |
| 2015/0293209 A1 * | 10/2015 | Fairley | .................. | G01S 13/449 342/21 |
| 2016/0025840 A1 * | 1/2016 | Steward | .................. | G01S 13/10 342/93 |
| 2016/0048129 A1 * | 2/2016 | Kolanek | .................. | F41H 11/02 701/2 |
| 2016/0050532 A1 * | 2/2016 | Hua | ....................... | H04W 4/023 455/456.2 |

FOREIGN PATENT DOCUMENTS

| | | | | |
|---|---|---|---|---|
| EP | 2877869 A1 * | 6/2015 | .............. | G01S 13/10 |
| WO | WO 2014018315 A1 * | 1/2014 | .............. | G01S 13/10 |

\* cited by examiner

*Primary Examiner* — John B Sotomayor
(74) *Attorney, Agent, or Firm* — Proskauer Rose LLP (57) ABSTRACT

Described are radar systems and methods. A transmit pulse is generated by the radar system. A first portion of the transmit pulse is processed by the radar system to form transmit pulse data. A second portion of the transmit pulse is directed by the radar system into a monitored volume. A return signal is received by the radar system, the return signal at least partially comprising a portion of the second portion of the transmit pulse reflected by one or more objects in the monitored volume. The return signal is processed, by the radar system, to form return signal data.

20 Claims, 7 Drawing Sheets

OPEN LOOP POWER OSCILLATOR DOPPLER RADAR

CROSS-REFERENCES TO RELATED APPLICATIONS

This application is a continuation of U.S. patent application Ser. No. 13/832,423, filed on Mar. 15, 2013, and titled "Open Loop Power Oscillator Doppler Radar," which claims the benefit of U.S. Patent Application No. 61/675,120, filed on Jul. 24, 2012, and titled "Method and Apparatus for Pulse Doppler Radar," the entire contents of each are incorporated herein by reference.

FIELD OF THE TECHNOLOGY

The present technology relates generally to radar systems and, more specifically, to Doppler radar systems using open loop oscillator power sources.

BACKGROUND

Existing radar systems can be complex electronic and mechanical designs comprising many systems, subsystems, and components. Often a given radar design is performed at the circuit level, resulting in an architecture which is not particularly scalable to different monitoring volumes or detection applications. For example, current Doppler radar systems typically rely on stable frequency generation techniques and subsequent pulse shaping that typically require low efficiency, high cost Radio Frequency (RF) amplifiers such as klystrons, traveling wave tube amplifiers (TWTAs), or coherent solid-state RF sources.

The availability of new technology can facilitate the design of application-specific radars, while providing more generality in potential applications. Fast scalar processors and inexpensive computer memory can be useful for this design approach. Additionally, "System on a Chip" (SOC) and "Digital Signal Processing (DSP) on a Chip" (DOC) technologies can be used for modular radar system designs.

SUMMARY OF THE TECHNOLOGY

Therefore there is a need for Doppler radar systems capable of using non-coherent power sources or power sources of instable frequency. In one aspect, there is a method performed by a Doppler radar system. The method can include generating, by the radar system, a transmit pulse. The method can include processing, by the radar system, a first portion of the transmit pulse to form transmit pulse data. The method can include directing, by the radar system, a second portion of the transmit pulse into a monitored volume. The method can include receiving, by the radar system, a return signal, the return signal at least partially comprising a portion of the second portion of the transmit pulse reflected by one or more objects in the monitored volume. The method can include processing, by the radar system, the return signal to form return signal data.

In some embodiments, the method can include providing, by the radar system, the transmit pulse data and the return signal data to a Doppler processing module; and comparing, by the Doppler processing module, the transmit pulse data and the return signal data to determine at least one of relative phase information and relative frequency information.

In some embodiments, generating, by the radar system, the transmit pulse includes generating the transmit pulse with one or more open loop power oscillators. In some embodiments, the one or more open loop power oscillators include one or more magnetrons. In some embodiments, the method can include generating the transmit pulse with a first open loop power oscillator; and generating a second transmit pulse with a second open loop power oscillator. In some embodiments, the method can include tuning a local oscillator based on one or more frequencies of the transmit pulse; and down converting the return signal based on a signal from the local oscillator to form an intermediate frequency signal. In some embodiments, the method can include match filtering, by the radar system, the transmit pulse data and the return signal data to produce a match filtering result. In some embodiments, the method can include performing, by the radar system, at least one of Doppler processing, clutter mapping, and constant false alarm rate processing on the match filtering result.

In another aspect, there is a Doppler radar system. The Doppler radar system can include one or more RF sources. The Doppler radar system can include a radar processing module configured to: generate, with the one or more RF sources, a transmit pulse; process a first portion of the transmit pulse to form transmit pulse data; direct a second portion of the transmit pulse into a monitored volume; receive a return signal, the return signal at least partially comprising a portion of the second portion of the transmit pulse reflected by one or more objects in the monitored volume; and process the return signal to form return signal data.

In another aspect, there is a Doppler radar system. The Doppler radar system can include one or more RF sources for generating a plurality of transmit pulses; a coupler connected to the one or more RF sources, wherein the coupler receives the transmit pulses from the one or more RF sources; a radar processing module connected to the coupler, wherein the coupler is configured to direct a first portion of a transmit pulse of the plurality of transmit pulses from the one or more RF sources to the radar processing module; an antenna assembly connected to the coupler, wherein the coupler is configured to direct a second portion of the transmit pulse from the one or more RF sources to the antenna assembly, and the antenna assembly configured to receive a return signal at least partially comprising a portion of the second portion of the transmit pulse reflected by one or more objects in a monitored volume and direct the return signal to the radar processing module; wherein the radar processing module is further configured to: process the first portion of the transmit pulse to form transmit pulse data; and process the return signal to form return signal data.

In some embodiments, the Doppler radar system can include a Doppler processing module configured to compare the transmit pulse data and the return signal data to determine at least one of relative phase information and relative frequency information. In some embodiments, the Doppler radar system can include one or more open loop power oscillators, wherein the radar processing module is further configured to generate the transmit pulse with the one or more open loop power oscillators.

In some embodiments, the Doppler radar system can include a first open loop power oscillator and a second open loop power oscillator and the radar processing module can be further configured to generate the transmit pulse with the first open loop power oscillator and generate a second transmit pulse with the second open loop power oscillator.

In some embodiments, the Doppler radar system can include a local oscillator; and the radar processing module can be further configured to tune the local oscillator based on one or more frequencies of the transmit pulse; and down convert the return signal based on a signal from the local oscillator to form an intermediate frequency signal.

In some embodiments, the radar processing module can be further configured to match filter the transmit pulse data and the return signal data to produce a match filtering result.

In some embodiments, the radar processing module can be further configured to perform at least one of Doppler processing, clutter mapping, and constant false alarm rate processing on the match filtering result.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The radar technology described herein can include radar architectures, radar systems, and methods. In some embodiments, the technology can utilize SOC devices and DOC devices. For example, the technology can include using processors that permit implementation of signal processing techniques within a relatively small space and using a power constrained platform. In some embodiments, the technology includes Doppler radar systems and methods based on low cost, high efficiency, non-phase locked and non-coherent self-oscillating frequency sources (e.g., magnetrons).

In some embodiments, the technology can capture information about the transmit pulse. For example, the radar technology can oversample a transmit pulse to generate and store a reference transmit pulse template for each unique radar pulse. The transmit pulse template can be compared against the received pulse to determine, for example, the relative phase and frequency information necessary for Doppler processing. Beneficially, by capturing information about each transmit pulse, the system can utilize non-phase locked and non-coherent self-oscillating frequency sources (e.g., magnetrons) for applications where such sources are typically inadequate.

The technology can be used for Moving Target Indicator (MTI), Moving Target Detection (MTD), and Doppler signal processing. For example, the technology can include a magnetron radar using built-in processors that maintains high dynamic range. By employing a high dynamic range, a high-fidelity template of the transmit pulse can be generated. Beneficially, the technology can provide enhanced detection performance of Doppler processing for numerous classes of targets with small Radar Cross Section (RCS).

In some embodiments, the technology can include a pulse modulator that creates a square-wave and stable pulse from the non-phase locked and/or non-coherent self-oscillating frequency source, thereby reducing undesirable frequency artifacts from the oscillator. In embodiments, the technology can include additional signal processing methodologies described herein to optimize the transmit pulse and reduce deleterious effects of temperature drift and production part variation.

Exemplary Radar System Architecture

Figure 1:
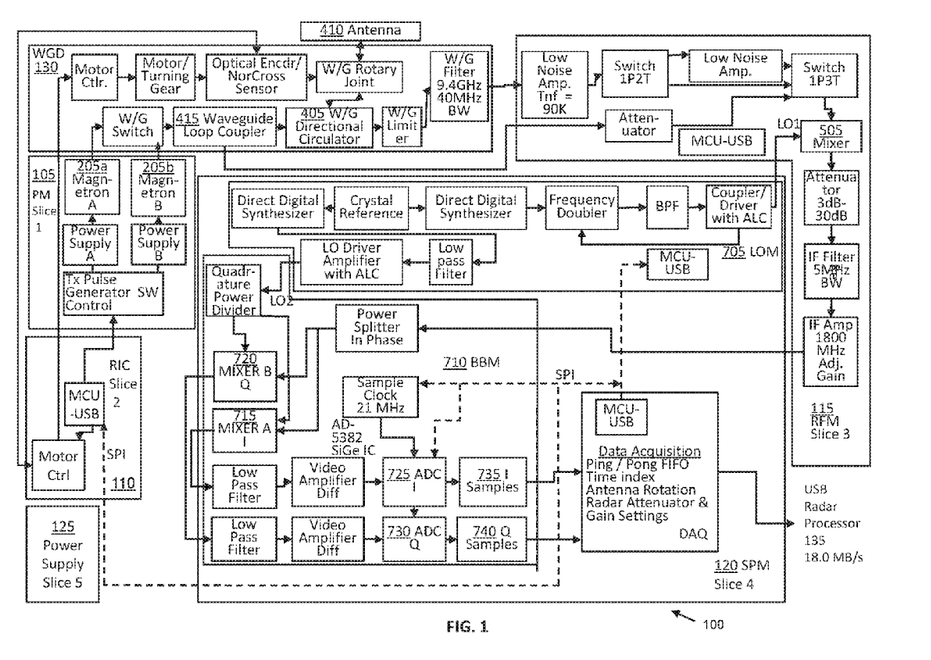
FIG. 1 is a block diagram of a radar system.

FIG. 1 is a block diagram of radar system 100. In the illustrated embodiment, radar system 100 includes five sub-assemblies or "slices," Pulse Modulator (PM) slice 105, Radar Interface Card (RIC) slice 110, Radio Frequency Module (RFM) slice 115, Signal Processing Module (SPM) slice 120, and Power Supply slice 125, and Waveguide Deck (WGD) 130. Radar system 100 can be designed to nominally function at, for example, 9.410 GHz, +/−15 MHz for some applications. Radar system 100 can operate at any frequency that, for example, magnetrons 205 or other RF sources can produce. PM slice 105 can generate an RF pulse for each transmission. In some embodiments, each RF pulse can be of a different phase and/or frequency. The transmit pulse can be sent to WGD 130, where directional circulator 405 (e.g., a three port directional circulator) can direct the RF transmit pulse to antenna 410 for transmission into the environment (e.g., the monitored volume or space). A portion of the transmit pulse energy can be coupled off prior to directional circulator 405 via waveguide coupler 415, and sent to RFM slice 115. In the illustrated embodiment, radar system 100 can be a monostatic design. Antenna 410 can subsequently receive the incoming return signal (e.g., the reflected signal or the signal resulting from the transmit pulse reflecting off of objects in the monitored volume). Directional circulator 405 can direct the return signal to the RFM slice 115.

Referring to RFM slice 115, a first frequency down-conversion of the transmit pulse and subsequent incoming return signal can be performed by RF mixer 505 of RFM slice 115. Local Oscillator Module (LOM) 705 of SPM slice 120 can generate a first local oscillator signal LO1 with a precise frequency that is applied to the return signal at RF mixer 505, producing an intermediate frequency (IF) signal. LO1 can be calculated based on frequency analysis of the transmitted pulse. Beneficially, by calculating LO1 based on the transmitted pulse, the frequency variations of magnetrons 205 (or other RF sources) can be accounted for. This IF signal can be nominally centered around 1800 MHz, and can be outputted to the Based Band Module (BBM) 710 of SPM slice 120. LOM 705 of SPM slice 120 can generate a second local oscillator signal LO2, nominally centered around 1800 MHz, which can be used to demodulate the IF frequency down to direct current within the BBM 710.

Within BBM 710, the IF signal can be divided into two paths with equal phase delays, and both paths can be applied to mixers A 715 and mixer B 720. The second local oscillator signal (LO2) can have a precise frequency equal to the IF signal frequency. The LO2 signal can be divided into two paths. A first path can be applied to mixer A 715. A second path that has an electrical delay equivalent to 90 degrees of phase shift relative to mixer A 715 can be applied to mixer B 720.

When the IF signal and the LO2 signal have identical frequency, a product at 0 frequency (direct current (DC)) is produced at the output of mixer A 715 and mixer B 720 and can be defined as baseband. The non-phase locked, self-oscillating transmit pulse source output (e.g., the output of magnetrons 205) can vary in frequency over the pulse duration. This frequency deviation can be maintained through the first frequency conversion to IF and to the frequency conversion to baseband. The result is a frequency deviation nominally centered around zero frequency (DC) at the output of mixer A 715 that can be referred to as "in phase" (I), and mixer B 720 that can be referred to as Quadrature (Q), as a result of the LO2 signal to mixer B 720 being shifted 90 degrees from that applied to mixer A 715. Together mixer A 715 and mixer B 720 output I and Q data or signal streams. The I signal stream can be applied to analog-to-digital converter (ADC) 725, and the Q signal stream can be applied to ADC 730.

In traditional Doppler radars the nominal I and Q ADC sample rate is equal to 1/(pulse width). In the present technology, to adequately capture and store the frequency deviation of the transmit pulse, the signal can be over sampled at a significantly higher ADC sample rate (e.g., nominally 20 MHz). The resulting digital data streams can be filtered using traditional digital filtering techniques to form I data sample 735 and Q data sample 740. In the illustrated embodiment, the same receiver path is used to capture and digitize both the transmit pulse and return signal, which can ensure that the phase relationship between the transmit pulse to return signal is maintained. In some embodiments, a frame of contiguous I data sample 735 and Q data sample 740 can be stored in a memory. The frame can begin with the I data sample 735 and Q data sample 740 of the transmit pulse (e.g., transmit pulse data), and continue to store I data sample 735 and Q data sample 740 for a time duration equal to "the time flight" of the transmit pulse to a target in the monitored volume at the maximum desired range, and the return of the reflected pulse back through antenna 410 to the ADC 725 and ADC 730 (e.g., return signal data). A time index and antenna rotation index can be appended to each frame as required for subsequent processing.

In some embodiments, the technology can produce a unique frame for each transmitted radar pulse. The frames can be sent to a radar processor 135 for further processing (e.g., Doppler processing). Radar processor 135 can process the reflected returns within a frame using the captured transmit pulse data from within the same frame using match filtering, as is known to those of skill in the art. The complex phase relationship of the return signal to the transmit pulse can be maintained because the return signal is a direct product of the associated transmitted pulse, and because a common receiver and digitizer path is used. Once this complex phase relationship is captured and normalized across a frame, the data is available to be processed by radar processor 135. Transmit pulse data and return signal data from subsequent frames are processed in a similar manner.

Beneficially, the systems and methods described herein permit Doppler processing and Doppler integration to be completed across multiple frames with an increase in processing gain. This can mitigate the issue of pulse to pulse variation common to non-phase locked, self-oscillating transmit pulse sources such as magnetrons, which can limit their utility in Doppler radar systems.

Figure 2:
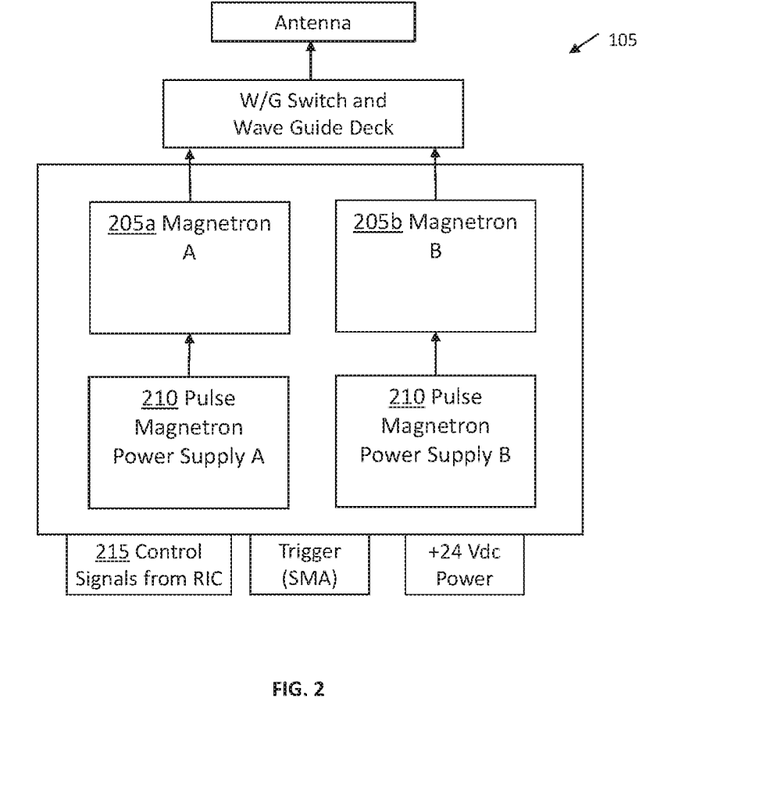
FIG. 2 illustrates a Pulse Modulator slice.

FIG. 2 illustrates Pulse Modulator slice 105. PM slice 105 can include the electronics required to generate the transmit pulse. PM slice 105 can include magnetrons 205 and magnetron power supplies 210. Magnetrons 205 can connect to an external waveguide switch that sends the transmit RF signal to WGD 130. PM slice 105 can include Built-in-test (BIT) features that use subsystem information available on the radar bus for problem detection. A prime/redundant switch system can allow either of the magnetrons 205 to function as the primary transmitter. Magnetrons 205 can each have an independent power supply 210 for full redundancy. In the illustrated embodiment, PM slice 105 can be controlled by signals 215 from RIC slice 110, as shown in FIG. 3.

While the embodiments described herein relate to a magnetron-based radar system, it should be appreciated that, in some embodiments, Pulse Modulator Slice 1 can utilize any open loop power oscillator operating at any frequency to generate the transmit pulse.

PM slice 105 can receive a pulse start commands from the Data Acquisition (DAQ) module 745 transmitted through RIC slice 110 via a SPI-bus protocol located on a common backplane connector connecting PM slice 105, RIC slice 110, and SPM slice 120. In some embodiments, multiple pulse repetition frequencies can be supported.

Figure 3:
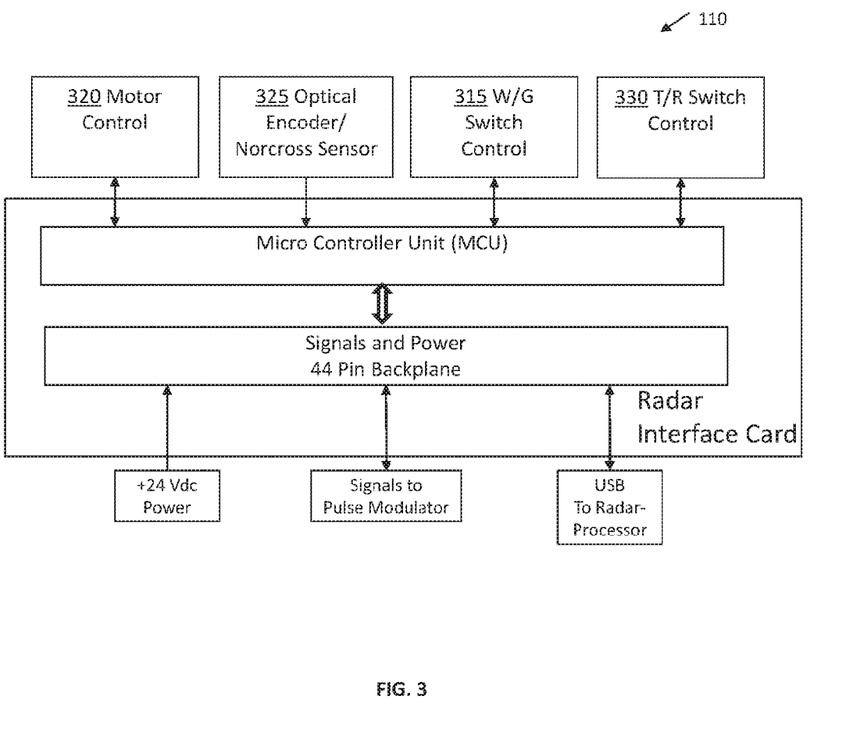
FIG. 3 illustrates a Radar Interface Card slice.

FIG. 3 illustrates RIC slice 110. With reference to FIG. 3, RIC slice 110 can include waveguide switch control 315 for selecting which magnetron of magnetrons 205 can be used, motor control 320 for rotating the antenna, optical encoder/NorCross control 325 for detecting antenna angular position with an optical encoder and North Cross (NorCross) optical sensor, and transmit/receive control 330 for controlling the transmit and receive paths of the transmitted pulse and receive signal. In some embodiments, a control for enabling the magnetron heater filament operation and a control for blanking the transmit pulse as a function of antenna azimuth angle is included. Beneficially, blanking the transmit pulse as a function of antenna azimuth angle can enable radar system 100 to be effectively deactivated when operating in conjunction with other radar units covering large and irregular areas.

PM slice 105 can use redundant magnetrons 205 for multiple purposes. Magnetrons 205 can be used separately as replacements to help extend radar system 100 operating life time and/or magnetrons 205 can be used simultaneously and interleave their respective pulse recurrent frequencies (PRFs) to increase the effective radar PRF. This can provide radar signal detection enhancement through Doppler integration, and can improve the overall radar sensitivity and accuracy while extending the effective range of radar system 100. Higher effective PRF can help alleviate "blind speed" detection nulls.

Figure 4:
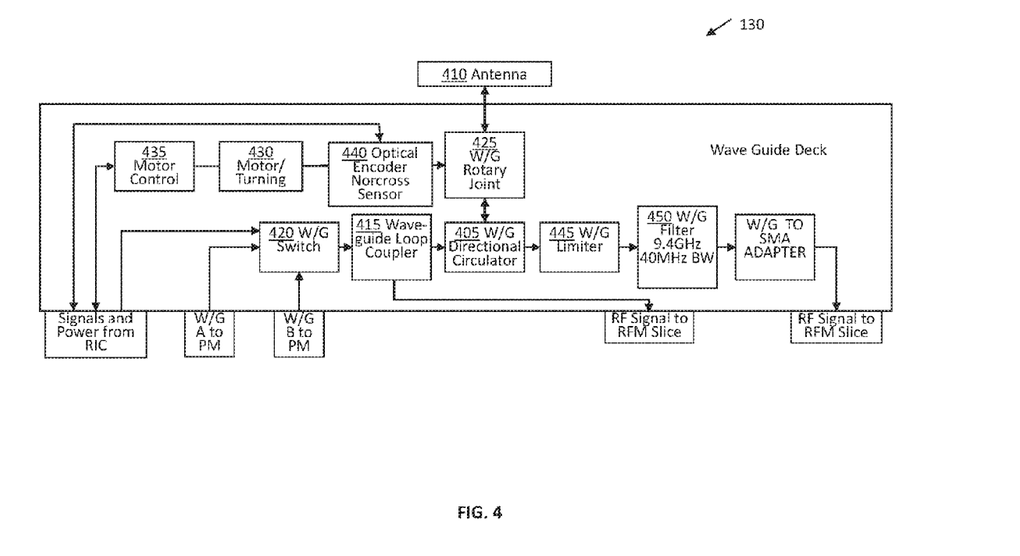
FIG. 4 illustrates a Waveguide Deck.

FIG. 4 illustrates WGD 410. The RF pulse from the PM slice 105 can be transmitted to antenna 410 via waveguide switch 420, waveguide directional circulator 405, and rotary joint 425, while enabling both signal send and receive using directional circulator 405. Waveguide loop coupler 415 can send the transmit signal for each pulse to the RFM slice 115, where the transmit pulse can be attenuated and sampled for later use in detection of the transmit pulse characteristics in the receive signal, as described herein. WGD 410 can include antenna-turning motor 430 with the associated motor controller electronics 435, controlled from RIC slice 110. The motor control interfaces with optical encoder and norcross optical sensor 440 for accurate determination of the angle of antenna 410 using reference crossings (not shown). This information can be acquired in DAQ module 745.

The transmit signal can be passed through directional circulator 405 to antenna 410 and radiated through the designated external monitoring volume. Antenna 410 can also receive the reflected portion of the transmitted signal (e.g., return signal). The return signal passes through waveguide limiter 445 and waveguide filter 450. Waveguide filter 450 can pass the signal to the RFM slice 115. In the illustrated embodiment, the transmit pulse can be nominally 9.41 GHz, with a 40 MHz bandwidth.

Figure 5:
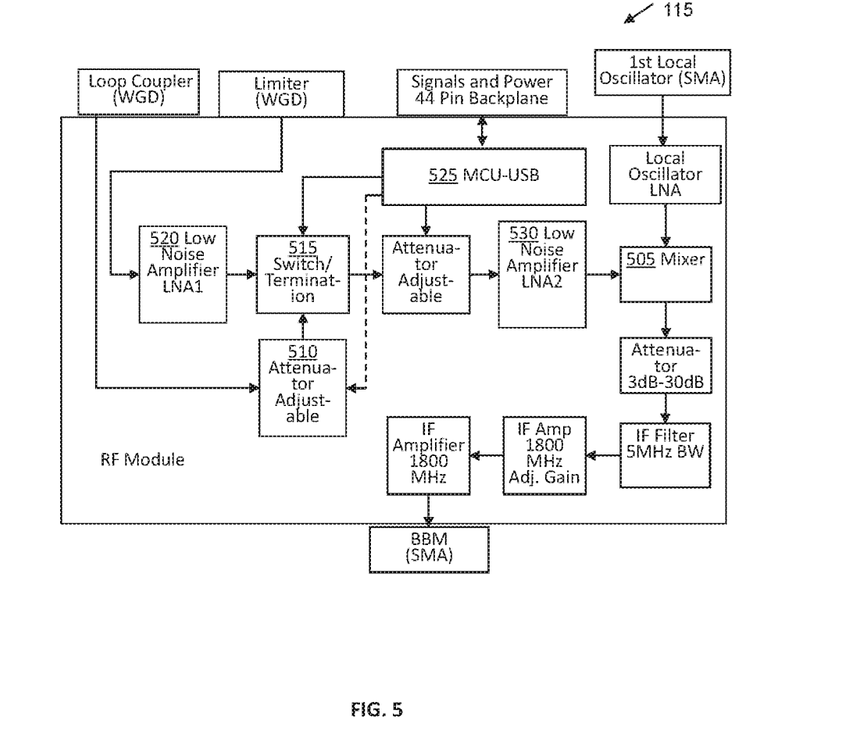
FIG. 5 illustrates a Radio Frequency Module slice.

FIG. 5 illustrates RFM slice 115. The transmit pulse signal (e.g., transmit pulse template) from waveguide loop coupler 415 is passed through adjustable attenuator 510 to a high isolation, SPDT microwave switch 515. The return signal from limiter 445 can be passed through low noise amplifier 520, appropriately terminated and attenuated. The return signal passes from low noise amplifier 520 to microwave switch 515. Switch 515 is controlled by Microcontroller Unit (MCU)

525, passing either the template pulse or the return signal through low noise amplifier. The signal is mixed against a signal from LOM 705, appropriately amplified, and passed through intermediate frequency filter with, e.g., 5 MHz bandwidth. The intermediate frequency signal, or IF signal, can be nominally centered on 1800 MHz. The IF signal can be processed using a combination of low noise amplifiers, gain adjustment, and bandpass filtering, and that data is provided to the BBM 710.

Figure 6:
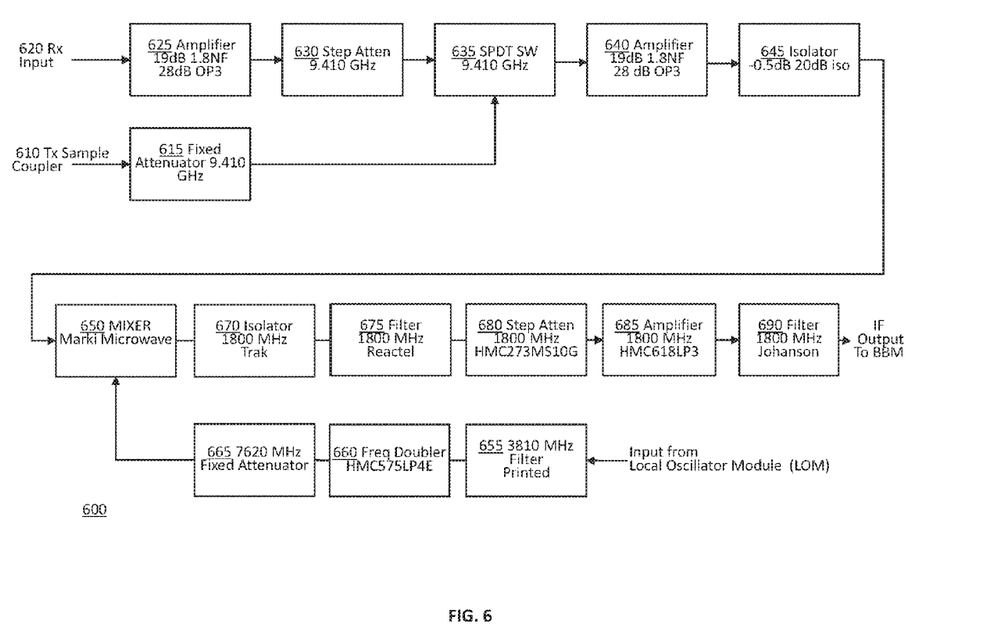
FIG. 6 depicts an exemplary signal flow chart.

FIG. 6 depicts an exemplary signal flow chart 600. In FIG. 6, transmit signal 610 is received (e.g., from loop coupler 415). Transmit pulse 610 passes through attenuator 615 to switch 635. Return signal 620 passes through amplifier 625 and attenuator 630 to switch 635. Switch 635 can control whether transmit pulse 610 or return signal 620 is passed to amplifier 640. The signal from amplifier 640 passes through isolator 645 to mixer 650. As described above, mixer 650 can apply a local oscillator signal with a precise frequency based on the transmit pulse. A LOM (e.g., LOM 705) can produce a signal that passes through Filter 655, doubler 660, and attenuator 665 into mixer 650. The signal from mixer 650 then passes through isolator 670, filter 675, attenuator 680, amplifier 685, and filter 690 to generate the IF signal.

Figure 7:
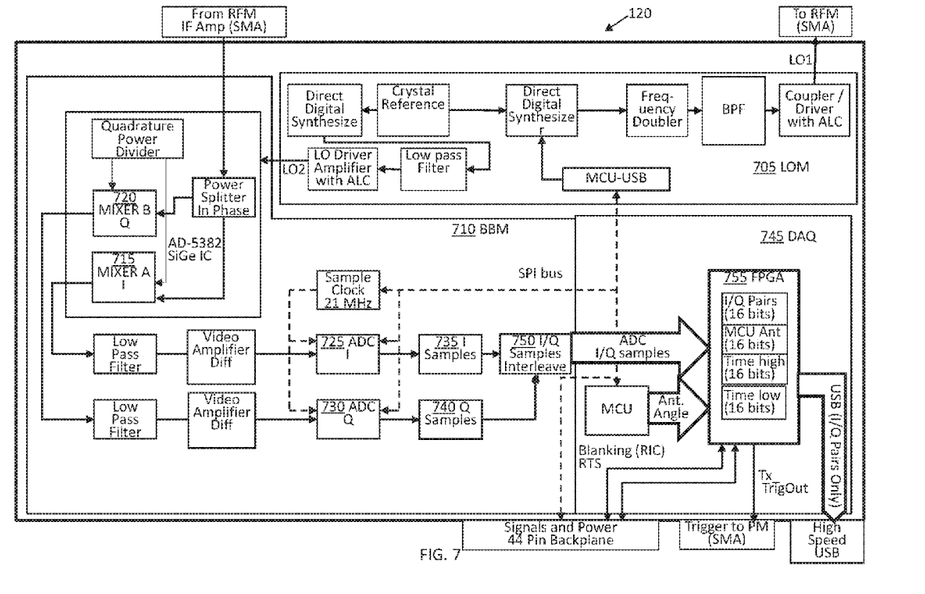
FIG. 7 depicts a Signal Processing Module slice.

FIG. 7 depicts SPM slice 120. As discussed above, SPM slice 120 contains LOM 705, which operates as previously described. Within BBM 710, the IF signal can be divided into two paths with equal phase delays, and both paths are applied to mixer A 715 and mixer B 720. A Local Oscillator Module (LOM) 705 of SPM slice 120 generates a local oscillator signal LO2 with a precise frequency equal to the IF signal frequency. The LO2 signal can be divided into two paths. A first path can be applied to mixer A 715. A second path that has an electrical delay equivalent to 90 degrees of phase shift relative to mixer A 715 can be applied to mixer B 720. Mixer A 715 and mixer B 720 output I and Q data or signal streams. The I signal stream can be applied to ADC 725, and the Q signal stream can be applied to ADC 730. A frame of contiguous I data sample 735 and Q data sample 740 can be generated by interleaver 750 at a double data rate, and forwarded to the DAQ module 745. FPGA 755 of DAQ module 745 can combine the interleaved I-Q samples with time and antenna position information, and the entire frame of data can be transferred to radar processor 135.

Digital radar data (e.g., frames of transmit pulse data and return signal data) obtained using the technology described herein can be further processed in a variety of ways, such as Moving Target Indicator (MTI), Moving Target Detection (MTD), and Pulse Doppler Detection processing, as is well known by those of skill in the art.

The radar technology described herein can support the systems and methods described in U.S. Pat. No. 7,876,260, issued Jan. 25, 2011, and assigned to Laufer Wind Group LLC. U.S. Pat. No. 7,876,260 describes, in part, methods and systems for preventing and/or minimizing light pollution by utilizing actively-controlled obstruction warning lights. The radar technology described herein can be incorporated into the radar units described in U.S. Pat. No. 7,876,260.

The above-described techniques can be implemented in digital electronic circuitry, or in computer hardware, firmware, software, or in combinations of them. The implementation can be as a computer program product, i.e., a computer program tangibly embodied in an information carrier, e.g., in a non-transitory machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a Doppler radar system comprising:
generating, by the radar system, a transmit pulse;
processing, by the radar system, a first portion of the transmit pulse to form transmit pulse data;
directing, by the radar system, a second portion of the transmit pulse into a monitored volume;
receiving, by the radar system, a return signal, the return signal at least partially comprising a portion of the second portion of the transmit pulse reflected by one or more objects in the monitored volume;
tuning a local oscillator based on one or more frequencies of the transmit pulse; and
processing, by the radar system, the return signal to form return signal data wherein the processing comprises down converting the return signal based on a signal from the local oscillator to form an intermediate frequency signal, wherein the signal from the local oscillator is calculated based on the transmit pulse.

2. The method of claim 1, further comprising:
providing, by the radar system, the transmit pulse data and the return signal data to a Doppler processing module;
comparing, by the Doppler processing module, the transmit pulse data and the return signal data to determine at least one of relative phase information and relative frequency information.

3. The method of claim 1, further comprising:
providing, by the radar system, the transmit pulse data and the return signal data to a Doppler processing module;
comparing, by the Doppler processing module, the transmit pulse data and the return signal data to determine relative frequency information.

4. The method of claim 1, wherein generating, by the radar system, the transmit pulse comprises generating the transmit pulse with one or more open loop power oscillators.

5. The method of claim 3, wherein the one or more open loop power oscillators comprise one or more magnetrons.

6. The method of claim 1, further comprising:
generating the transmit pulse with a first open loop power oscillator;
generating a second transmit pulse with a second open loop power oscillator.

7. The method of claim 1, further comprising:
match filtering, by the radar system, the transmit pulse data and the return signal data to produce a match filtering result.

8. The method of claim 7, further comprising:
performing, by the radar system, at least one of Doppler processing, clutter mapping, and constant false alarm rate processing on the match filtering result.

9. A Doppler radar system comprising:
one or more RF sources;
a local oscillator; and
a radar processing module configured to:
generate, with the one or more RF sources, a transmit pulse;
process a first portion of the transmit pulse to form transmit pulse data;
direct a second portion of the transmit pulse into a monitored volume;
receive a return signal, the return signal at least partially comprising a portion of the second portion of the transmit pulse reflected by one or more objects in the monitored volume;
tune the local oscillator based on one or more frequencies of the transmit pulse; and
process the return signal to form return signal data by at least down converting the return signal based on a signal from the local oscillator to form an intermediate frequency signal, wherein the signal from the local oscillator is calculated based on the transmit pulse.

10. The Doppler radar system of claim 9, further comprising:
a Doppler processing module configured to compare the transmit pulse data and the return signal data to determine at least one of relative phase information and relative frequency information.

11. The Doppler radar system of claim 9, further comprising:
a Doppler processing module configured to compare the transmit pulse data and the return signal data to determine relative frequency information.

12. The Doppler radar system of claim 9 further comprising one or more open loop power oscillators, wherein the radar processing module is further configured to generate the transmit pulse with the one or more open loop power oscillators.

13. The Doppler radar system of claim 11, wherein the one or more open loop power oscillators comprise one or more magnetrons.

14. The Doppler radar system of claim 9 further comprising:
a first open loop power oscillator and a second open loop power oscillator;
wherein the radar processing module is further configured to generate the transmit pulse with the first open loop power oscillator and generate a second transmit pulse with the second open loop power oscillator.

15. The Doppler radar system of claim 14, wherein the radar processing module is further configured to:
match filter the transmit pulse data and the return signal data to produce a match filtering result.

16. The Doppler radar system of claim 15, wherein the radar processing module is further configured to:
perform at least one of Doppler processing, clutter mapping, and constant false alarm rate processing on the match filtering result.

17. A Doppler radar system comprising:
one or more RF sources for generating a plurality of transmit pulses;
a coupler connected to the one or more RF sources, wherein the coupler receives the transmit pulses from the one or more RF sources;
a radar processing module connected to the coupler, wherein the coupler is configured to direct a first portion of a transmit pulse of the plurality of transmit pulses from the one or more RF sources to the radar processing module;
an antenna assembly connected to the coupler, wherein the coupler is configured to direct a second portion of the transmit pulse from the one or more RF sources to the antenna assembly, and the antenna assembly configured to receive a return signal at least partially comprising a portion of the second portion of the transmit pulse reflected by one or more objects in a monitored volume and direct the return signal to the radar processing module;

a local oscillator;

wherein the radar processing module is further configured to:

process the first portion of the transmit pulse to form transmit pulse data;

tune the local oscillator based on one or more frequencies of the transmit pulse; and process the return signal to form return signal data by at least down converting the return signal based on a signal from the local oscillator to form an intermediate frequency signal, wherein the signal from the local oscillator is calculated based on the transmit pulse.

18. The Doppler radar system of claim 17, further comprising:

a Doppler processing module configured to compare the transmit pulse data and the return signal data to determine at least one of relative phase information and relative frequency information.

19. The Doppler radar system of claim 17, further comprising:

a Doppler processing module configured to compare the transmit pulse data and the return signal data to determine relative frequency information.

20. The Doppler radar system of claim 17, wherein the one or more RF sources comprise one or more magnetrons.

* * * * *